(12) United States Patent
Ogawa et al.

(10) Patent No.: US 11,222,753 B2
(45) Date of Patent: Jan. 11, 2022

(54) ELECTRODE, ELECTROLYTIC CAPACITOR, AND METHOD FOR MANUFACTURING THOSE

(71) Applicant: Panasonic Intellectual Property Management Co., Ltd., Osaka (JP)

(72) Inventors: Miwa Ogawa, Osaka (JP); Naomi Kurihara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 52 days.

(21) Appl. No.: 16/558,271

(22) Filed: Sep. 2, 2019

(65) Prior Publication Data

US 2020/0006011 A1 Jan. 2, 2020

Related U.S. Application Data

(63) Continuation of application No. PCT/JP2018/006139, filed on Feb. 21, 2018.

(30) Foreign Application Priority Data

Mar. 30, 2017 (JP) .............................. JP2017-066562

(51) Int. Cl.
*H01G 9/045* (2006.01)
*H01G 9/00* (2006.01)
(Continued)

(52) U.S. Cl.
CPC ........... *H01G 9/045* (2013.01); *H01G 9/0032* (2013.01); *H01G 9/15* (2013.01); *H01G 11/00* (2013.01)

(58) Field of Classification Search
CPC ........ H10G 9/045; H01G 9/15; H01G 9/0032; H01G 9/045; H01G 11/00
(Continued)

(56) References Cited

U.S. PATENT DOCUMENTS

2008/0094775 A1  4/2008  Sneh et al.
2011/0310526 A1  12/2011 Sneh et al.

FOREIGN PATENT DOCUMENTS

| JP | 2003-257796 | 9/2003 |
| JP | 2008-507847 | 3/2008 |
| JP | 2012-043960 | 3/2012 |

OTHER PUBLICATIONS

International Search Report of PCT application No. PCT/JP2018/006139 dated May 22, 2018.

*Primary Examiner* — Arun Ramaswamy
(74) *Attorney, Agent, or Firm* — McDermott Will and Emery LLP

(57) ABSTRACT

An electrode includes a core portion including a first metal, and a porous portion disposed in contact with the core portion. The porous portion includes a porous body, a first dielectric layer, and a second dielectric layer. The porous body is integrated with the core portion and includes the first metal. The first dielectric layer covers at least a part of a surface of the porous body. And the second dielectric layer covers at least a part of the first dielectric layer. The first dielectric layer includes oxide of first metal, and the second dielectric layer includes oxide of a second metal. The second metal is different from the first metal. When T is a thickness of the porous portion, the second metal is distributed to a region closer to the core portion than a position of 0.5T from a boundary between the core portion and the porous portion.

17 Claims, 3 Drawing Sheets

(51) Int. Cl.
*H01G 9/15* (2006.01)
*H01G 11/00* (2013.01)
(58) Field of Classification Search
USPC ....... 361/311, 502, 503, 523, 508, 509, 524, 361/528
See application file for complete search history.

ELECTRODE, ELECTROLYTIC CAPACITOR, AND METHOD FOR MANUFACTURING THOSE

RELATED APPLICATIONS

This application is a continuation of the PCT International Application No. PCT/JP2018/006139 filed on Feb. 21, 2018, which claims the benefit of foreign priority of Japanese patent application No. 2017-066562 filed on Mar. 30, 2017, the contents all of which are incorporated herein by reference.

BACKGROUND

1. Technical Field

The present disclosure relates mainly to an electrode of an electrolytic capacitor.

2. Description of the Related Art

A metal foil including a valve metal is used as an anode body of an electrolytic capacitor. From the viewpoint of increasing electrostatic capacity, at least a part of a main surface of a metal material is subjected to a treatment such as etching to form a porous body. Subsequently, the porous body is subjected to an anodizing treatment to form a metal oxide (dielectric) layer on a pore or uneven surface.

In Unexamined Japanese Patent Publication No. 2003-257796, it is proposed that a composite oxidation film made of a plurality of valve metals is formed as a dielectric material in order to increase the electrostatic capacity. Specifically, In Unexamined Japanese Patent Publication No. 2003-257796, it is proposed that a mixed layer of an aluminum oxide and a valve metal oxide (other than the aluminum oxide) is formed as the dielectric material using a valve metal oxide precursor solution.

Unexamined Japanese Patent Publication No. 2012-43960 teaches that a dielectric layer is formed on an etched surface of the metal foil by an atomic layer deposition method instead of the anodizing treatment.

SUMMARY

According to a first aspect of the present disclosure, an electrode includes a core portion including a first metal, and a porous portion provided disposed in contact with the core portion. The porous portion includes a porous body, a first dielectric layer, and a second dielectric layer. The porous body is integrated with the core portion and includes the first metal. The first dielectric layer covers at least a part of a surface of the porous body. And the second dielectric layer covers at least a part of the first dielectric layer. The first dielectric layer includes oxide of first metal, and the second dielectric layer includes oxide of a second metal. The second metal is different from the first metal. When T is a thickness of the porous portion, the second metal is distributed to a region closer to the core portion than a position of 0.5T from a boundary between the core portion and the porous portion.

According to a second aspect of the present disclosure, an electrode includes a core portion including a first metal, and a porous portion disposed in contact with the core portion. The porous portion includes a porous body, a first dielectric layer, and a second dielectric layer. The porous body is integrated with the core portion and includes the first metal. The first dielectric layer covers at least a part of a surface of the porous body. And the second dielectric layer covers at least a part of the first dielectric layer. The first dielectric layer includes oxide of first metal, and the second dielectric layer includes oxide of a second metal. The second metal is different from the first metal. A dynamic contact angle of water in the porous portion is less than or equal to 60°.

According to a third aspect of the present disclosure, an electrolytic capacitor includes the electrode, and at least one of an electrolytic solution and a solid electrolyte. The at least one of an electrolytic solution and a solid electrolyte is included in the porous portion of the electrode.

According to a fourth aspect of the present disclosure, an electrode manufacturing method includes the following first to third steps. In the first step, a core portion including a first metal and a porous body that is integrated with the core portion and includes a first metal are prepared. In the second step, a first dielectric layer including oxide of the first metal is formed to cover at least a part of a surface of the porous body by performing anodization of the porous body. In the third step, a second dielectric layer including oxide of a second metal is formed to cover at least a part of a surface of the first dielectric layer. The second metal is different from the first metal.

According to a fifth aspect of the present disclosure, an electrolytic capacitor manufacturing method includes the steps of preparing the electrode, and letting the porous portion of the electrode include at least one of an electrolytic solution and a solid electrolyte.

In the present disclosure, wettability of the porous portion to the electrolytic solution, the solid electrolyte, or a raw material liquid used to form the solid electrolyte is improved. Thus, the electrostatic capacity of the electrolytic capacitor can be improved.

DETAILED DESCRIPTION OF EMBODIMENT

Figure 1:
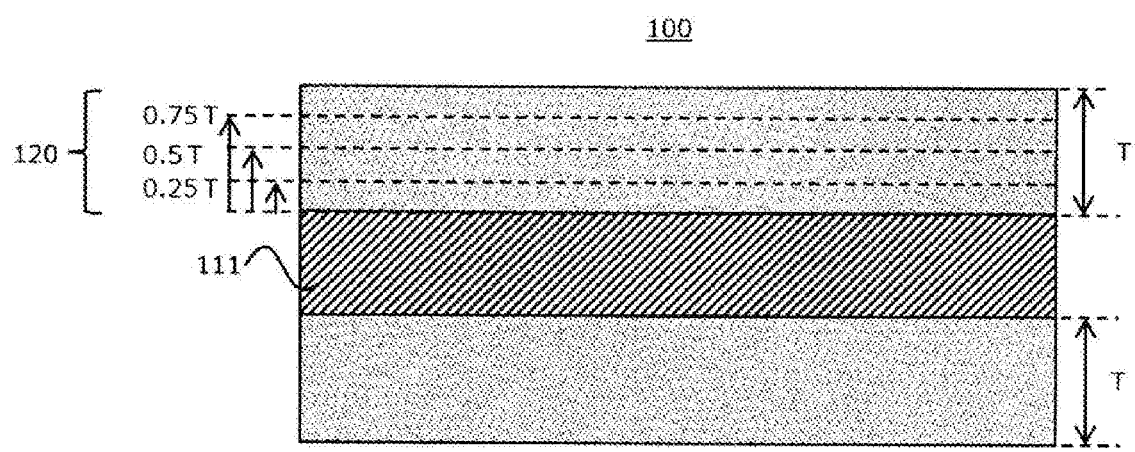
FIG. 1 is a sectional view schematically illustrating an example of an electrode according to an exemplary embodiment of the present disclosure.

It is difficult to from a thin, uniform composite oxidation film by the method in which the valve metal oxide precursor solution is used as disclosed in Unexamined Japanese Patent Publication No. 2003-257796. In the method disclosed in Unexamined Japanese Patent Publication No. 2012-43960, since film quality of the formed dielectric material is inferior, a sufficient capacitance of the capacitor is not obtained, and an withstand voltage of the capacitor decreases.

An electrode according to an exemplary embodiment includes a core portion including a first metal and a porous portion disposed in contact with the core portion. The porous portion includes: a porous body that is integrated with the core portion and includes the first metal; a first dielectric layer covering at least a part of a surface of the porous body; and a second dielectric layer covering at least a part of the first dielectric layer.

For example, an integrated body of the core portion and the porous body is obtained by roughening a part of a metal foil made of the first metal through etching. An inside portion of the metal foil, which is not etched but remains, constitutes the core portion, and an outside portion of the metal foil that is etched to be porous constitutes the porous body. Hereinafter, the integrated body of the core portion and the porous body is referred to as a metal substrate.

The electrode of the exemplary embodiment satisfies the following first condition or second condition. The first condition is a condition that, assuming that T is a thickness of the porous portion, a second metal is distributed to a region (a deep part of the porous portion) closer to the core portion than a position of 0.5T from a boundary between the core portion and the porous portion. The second condition is a condition that a dynamic contact angle of water in the porous portion is less than or equal to 60°. The first condition and the second condition may simultaneously be satisfied. For example, when the first condition is satisfied, the second condition can also be satisfied.

The first dielectric layer includes oxide of the first metal, and is typically an oxide film that is formed by anodization of the porous body. A valve metal suitable for the formation of the oxide film is selected as the first metal. A pit or a pore of the porous body is a space surrounded by a frame work or a wall (hereinafter, referred to as a metal frame work) made of the first metal. The first dielectric layer is provided so as to cover at least a part of the surface of the metal frame work.

The second dielectric layer includes oxide of the second metal. The second metal is different from the first metal. The second dielectric layer may be formed on the surface of the first dielectric layer after the first dielectric layer is formed.

The second dielectric layer may include a composite oxide including the first metal and the second metal. When the second dielectric layer including the composite oxide is formed, the oxide of the second metal is provided so as to cover at least a part of the surface of the metal frame work of the porous body, and then the first dielectric layer may be formed by the anodization. In this case, the oxide of the first metal is generated so as to repair a defect of the oxide of the second metal, and the second dielectric layer including the composite oxide is formed. The first dielectric layer is formed so as to be interposed between the second dielectric layer including the composite oxide and the metal frame work.

Since the second dielectric layer is provided so as to cover at least a part of the first dielectric layer, the second dielectric layer exists in many regions of a surface layer of the porous portion. Consequently, this improves wettability of the porous portion to water, and thus improves wettability of the porous portion to the electrolytic solution containing a polar solvent, the solid electrolyte, or a raw material liquid used to form the solid electrolyte.

Figure 2:
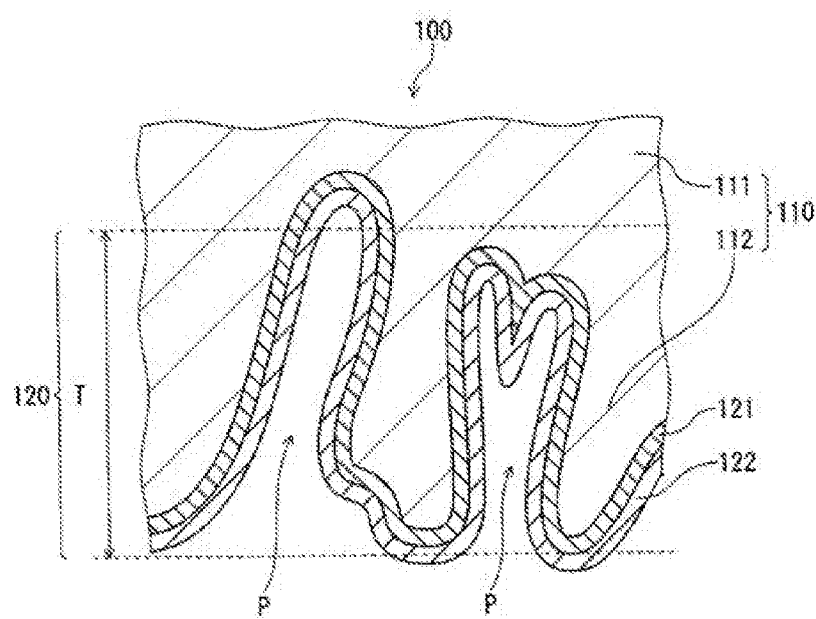
FIG. 2 is an enlarged sectional view schematically illustrating a porous portion of the electrode according to the exemplary embodiment of the present disclosure.

FIG. 1 is a sectional view schematically illustrating an example of a foil-shaped electrode (electrode foil) according to the exemplary embodiment of the present disclosure. FIG. 2 is an enlarged sectional view schematically illustrating the porous portion. Electrode 100 includes core portion 111 and porous portion 120. Porous portion 120 includes porous body 112 that is integrated with core portion 111 and made of the first metal, first dielectric layer 121 covering at least a part of porous body 112, and second dielectric layer 122 covering at least a part of the first dielectric layer.

In metal substrate 110 including core portion 111 and porous body 112, a width of pit P of porous body 112 is very narrow. For example, a modal pore diameter of a pore diameter distribution measured with a mercury porosimeter ranges from 50 nm to 2000 nm, inclusive. In order to form second dielectric layer 122 to a deep part of porous body 112 including such a fine pit P or pore, formation method is not particularly limited, but an Atomic Layer Deposition (ALD) method is suitable.

When electrode 100 of the exemplary embodiment satisfies the first condition, since the second metal is distributed to the deep part of porous portion 120, a contact area between porous portion 120 and the electrolytic solution or the solid electrolyte increases, and thus the electrostatic capacity increases. In order to significantly increase the electrostatic capacity, second dielectric layer 122 is preferably formed to the deep part (the deep part of pit P of porous body 112) of porous portion 120 as much as possible. The second metal is preferably distributed to a region closer to core portion 111 than a position of 0.25T from the boundary between core portion 111 and porous portion 120, and more preferably distributed to a position of 0.05T from the boundary between core portion 111 and porous portion 120.

A distribution state of element such as the first metal and the second metal in the porous portion can be acquired, for example, through sectional element mapping of the porous portion of the electrode. Element concentrations of the first metal and the second metal can quantitatively be measured by performing sectional quantitative X-ray mapping of the porous portion using energy dispersive X-ray spectroscopy (EDX).

When the electrode of the exemplary embodiment satisfies the second condition, a dynamic contact angle of water in the porous portion may be less than or equal to 60°, preferably less than or equal to 40°, more preferably less than or equal to 35°, further preferably less than or equal to 20°. As the dynamic contact angle decrease, the contact area between the porous portion and the electrolytic solution or the solid electrolyte increases more easily. Hence, it is advantageous for increasing the electrostatic capacity. It is generally difficult to decrease the contact angle to 0°. However, for example, it is possible to decrease the contact angle to 5° or less.

The dynamic contact angle of water in the porous portion is measured by a drop method. Specifically, after letting a water droplet drop on the surface of the porous portion, a change of an angle (contact angle) between the surface and the water droplet is measured over time. More specifically, an image of the water droplet is successively acquired five times (that is, every 0.2 sec) per second immediately after the drop of the water droplet. And image analysis of the acquired images is performed to calculate a contact angle from each of the images, and the change in the contact angle is graphed. In this case, contact angles from the drop of the water droplet to 100 seconds later are calculated.

The distribution state of the second dielectric layer (that is, the second metal) in the porous portion can be evaluated by a distribution of an atom ratio (atomic number ratio) of the second metal to the first metal in the porous portion. When a change rate of the atom ratio of the second metal to the first metal in a thickness direction of the porous portion is small, it can be considered that the second dielectric layer is uniformly formed in the thickness direction of the porous portion.

For example, assuming that $R_{0.5}$ is an atom ratio of the second metal to the first metal at the position of 0.5T from the boundary between core portion 111 and porous portion 120, and that $R_{0.75}$ is an atom ratio of the second metal to the first metal at a position of 0.75T from the boundary between core portion 111 and porous portion 120, $R_{0.75}$ tends to be greater than $R_{0.5}$ with increasing deviation in the distribution state of the second metal. On the other hand, when $0.8 \leq R_{0.75}/R_{0.5} \leq 1.2$ is satisfied, the second metal is distributed to the deep part of porous portion 120. And thus it is said that the wettability to water in the deep part is improved. In particular, more preferably $0.9 \leq R_{0.75}/R_{0.5} \leq 1.1$ is satisfied.

Similarly, assuming that $R_{0.25}$ is an atom ratio of the second metal to the first metal at the position of 0.25T from the boundary between core portion 111 and porous portion 120, preferably $0.8 \leq R_{0.5}/R_{0.25} \leq 1.4$ is satisfied, and more preferably $0.9 \leq R_{0.5}/R_{0.25} \leq 1.3$ is satisfied.

In order to effectively improve the wettability or permeability of a raw material solution used to form the electrolytic solution or the solid electrolyte to porous portion 120, the second metal is preferably selected so that the wettability of the oxide of the second metal to water is higher than the wettability of the oxide of the first metal to water.

More specifically, when the first metal is aluminum, preferably the second metal is one selected from a group consisting of titanium, tantalum, niobium, zirconium, hafnium, and silicon. Among them, a titanium or tantalum is more preferable because oxide of titanium or tantalum has higher wettability to water than oxide of aluminum.

An evaluation method for the wettability of the oxide of the first metal and the oxide of the second metal to water is not particularly limited, but the following method can be used. For example, a film made of the oxide of the first metal and a film made of the oxide of the second metal are respectively formed on the surface of a plain metal foil on which etching is not performed. And then a static contact angle of water to each of the films is measured. From those, the wettability of the oxide of the first metal and the oxide of the second metal to water are evaluated. It is evaluated that the wettability of the oxide to water is high when the contact angle is small.

An electrode or electrolytic capacitor manufacturing method of the exemplary embodiment including steps (i) to (iii) will be described below. Meanwhile, the manufacturing method is not limited to the following method.

The step (i) is a step of preparing the core portion and the porous body that is integrated with the core portion and made of the first metal.

The step (ii) is a step of performing anodization of the porous body, and forming the first dielectric layer including the oxide of the first metal to cover at least a part of the surface of the metal frame work of the porous body.

The step (iii) is a step of forming the second dielectric layer including oxide of the second metal to cover at least a part of the surface of the first dielectric layer by the ALD method. The second metal is different from the first metal.

The electrolytic capacitor manufacturing method of the exemplary embodiment includes a step of preparing the electrode obtained through the steps (i) to (iii) and a step (step (iv)) of letting the porous portion of the electrode include at least one of the electrolytic solution and the solid electrolyte.

Each step will be described in detail below.

(i) Step of Preparing Core Portion and Porous Body

Figure 3A:
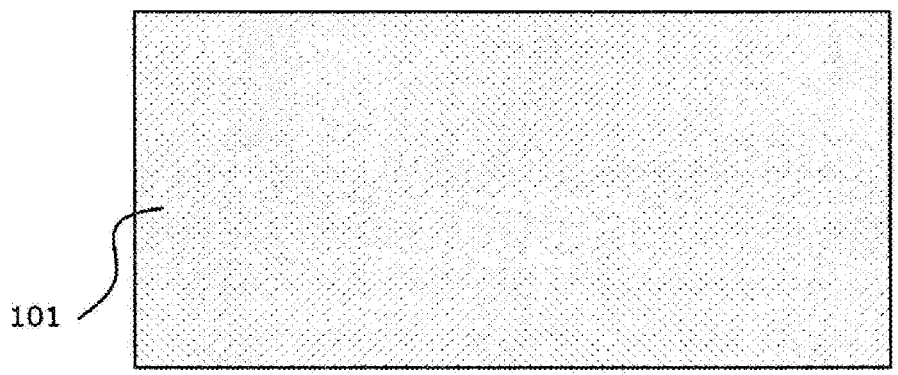
FIG. 3A is a sectional view schematically illustrating a metal foil according to the exemplary embodiment of the present disclosure.

For example, a metal material made of the first metal is prepared. A shape of the metal material is not particularly limited, but metal foil 101 in FIG. 3A is preferably used. The following description is for the case that the metal foil is used.

A type of the first metal is not particularly limited, but it is preferred to use a valve metal such as aluminum (Al), tantalum (Ta), or niobium (Nb), or an alloy including a valve metal, from the viewpoint of facilitating formation of the first dielectric layer. A thickness of the metal foil is not particularly limited, but ranges from 5 μm to 300 μm, inclusive, for example.

Figure 3B:
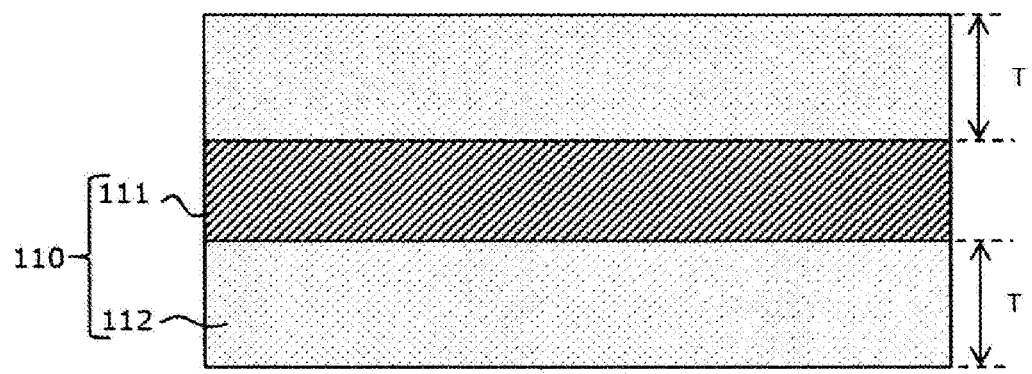
FIG. 3B is a sectional view schematically illustrating a metal substrate formed by etching of the metal foil in FIG. 3A.

Subsequently, a plurality of pits P or pores are formed in an outside part of metal foil 101 by making a part (at least a part of the outside part) of metal foil 101 porous or roughened. In this way, metal substrate 110 including core portion 111 and porous body 112 integrated with the core portion 111 is obtained as illustrated in FIG. 3B. Porous body 112 may be formed only on one side or on both sides of core portion 111. Making metal foil 101 porous is preferably performed by etching metal foil 101. For example, DC etching by a DC current or AC etching by an AC current is performed as a treatment of etching.

A pore diameter of pit P or the pore in porous body 112 is not particularly limited, but preferably ranges from 50 nm to 2,000 nm, inclusive, from the viewpoint of increasing a surface area of porous body 112 and facilitating the formation of second dielectric layer 122 to the deep part of pit P. For example, the pore diameter of pit P is a modal pore diameter of a pore distribution measured with a mercury porosimeter.

A depth of pit P is not particularly limited, but may appropriately be set according to the thickness of metal foil 101. From the viewpoint of increasing the surface area of porous body 112 and maintaining strength of electrode 100, the depth of the pit P (the thickness of porous body 112 or the etched region) ranges preferably from 1/10 to 4/10, inclusive, of the thickness of metal foil 101 that is not etched yet. The thickness of porous body 112 or the etched region is an average value of any 10 points in a cross section of metal substrate 110 observed in an SEM image of the electrode 100.

The thicknesses of the first dielectric layer and the second dielectric layer is much smaller than thickness T of porous portion 120 of electrode 100, so that the thickness of porous body 112 or the etched region can be regarded as thickness T of porous portion 120 of the electrode.

(ii) Step of Forming First Dielectric Layer

Figure 4:
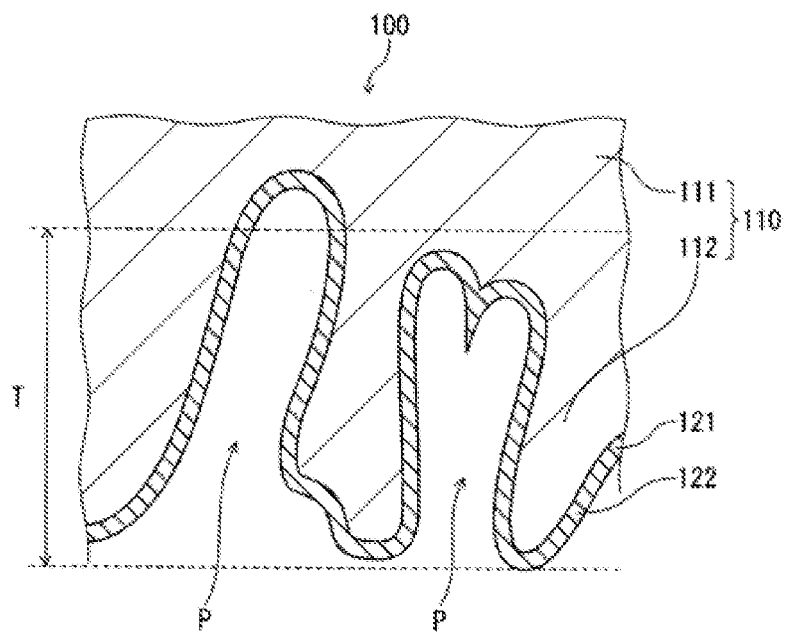
FIG. 4 is an enlarged sectional view schematically illustrating a porous body in which a first dielectric layer is formed.

Subsequently, the anodization of porous body 112 is performed, and first dielectric layer 121 including the oxide of the first metal is formed to cover at least a part of the surface of porous body 112. FIG. 4 is an enlarged view illustrating porous body 112 in which first dielectric layer 121 is formed.

A method for performing the anodization of porous body 112 is not particularly limited. For example, porous body 112 is immersed in an anodizing solution such as an adipic acid ammonium solution, and voltage is applied to metal substrate 110 (porous body 112) to perform anodizing, which allows the performance of the anodization of porous body 112. The thickness of first dielectric layer 121 changes depending on the applied voltage during the anodizing.

(iii) Step of Forming Second Dielectric Layer

Subsequently, the second dielectric layer including the oxide of the second metal is formed on porous body 112 on which first dielectric layer 121 is formed such that at least a part of first dielectric layer 121 is covered. The oxide of the second metal is deposited on the first dielectric layer by the ALD method, which allows the formation of the porous portion satisfying the first condition or the second condition. A thickness of the second dielectric layer is not particularly limited, but ranges from 0.5 nm to 200 nm, inclusive, for example.

The thicknesses of first dielectric layer 121 and second dielectric layer 122 are an average value of any 10 points in respective cross sections of first dielectric layer 121 and second dielectric layer 122 observed in a TEM image of the electrode 100.

A ratio between thickness T2 of second dielectric layer 122 and thickness T1 of first dielectric layer 121 is not particularly limited, but may appropriately be set according to an application, a desired effect, and the like. For example the ratio of thicknesses T1/T2 may be about 0.01, or be greater than or equal to 30.

The ALD method is a film deposition method in which supplying a source gas containing the second metal and an oxidizing agent are alternately supplied to a reaction chamber where an object is disposed and the layer (second dielectric layer) including the oxide of the second metal is formed on the surface of the object. In the ALD method, because of self-limiting action, the second metal is deposited on the surface of the object in units of atomic layers. For this reason, the thickness of the second dielectric layer is controlled by a number of cycles in which (1) supply of the source gas, (2) evacuation (purge) of the source gas, (3) supply of the oxidizing agent, and (4) evacuation (purge) of the oxidant are set to one cycle. That is, the ALD method is a preferred method from the viewpoint of easily controlling the thickness of a formed layer. In contrast to chemical vapor deposition (CVD) performed under a temperature condition of 400° C. to 900° C., the ALD method can be performed under a temperature condition of room temperature (25° C.) to 400° C. That is, the ALD method is preferable from the viewpoint of preventing thermal damage to the metal substrate and the first dielectric layer.

In the ALD method, a thin film can be formed on a surface of the deep part of the pit when the modal pore diameter of the pit is about 10 nm. As described above, pit P formed in porous body 112 typically has the pore diameter of 50 nm or more. For this reason, in the ALD method, the second dielectric layer can be formed even on the surface of the deep part of pit P having the small pore diameter, namely the pit having a large aspect ratio.

As illustrated in FIG. 2, electrode 100 in which second dielectric layer 122 is formed to the deep part of pit P to satisfy the first condition can easily be formed by the ALD method. The second metal is easily distributed to the region closer to core portion 111 than the position of 0.25T from the boundary between core portion 111 and porous portion 120. Further, the second metal can be distributed to the position of 0.05T from the boundary between core portion 111 and porous portion 120. Similarly, the electrode satisfying $0.8 \leq R_{0.75}/R_{0.5} \leq 1.2$ or $0.9 \leq R_{0.75}/R_{0.5} \leq 1.1$ is easily obtained, and the electrode satisfying $0.8 \leq R_{0.5}/R_{0.25} \leq 1.4$ or $0.9 \leq R_{0.5}/R_{0.25} \leq 1.3$ is easily obtained.

Preferably Ta, Nb, Si, Ti, Zr, and Hf are used as the second metal. Ta, Nb, Si, Ti, Zr, and Hf may be used singly or in combination of at least two thereof. In this case, the second dielectric layer can include at least one of $Ta_2O_5$, $Nb_2O_5$, $SiO_2$, $TiO_2$, $ZrO_2$, $HfO_2$, and the like. When the second dielectric layer includes at least two of the oxides of the second metal, these oxides may be mixed together or disposed in respective layers. Among them, $Ta_2O_5$, $TiO_2$, $HfO_2$ and $SiO_2$ are preferably used as the oxides of the second metal from the viewpoint of easily increasing the capacitance of the electrolytic capacitor.

Examples of the oxidizing agent used in the ALD method include water, oxygen, and ozone. The oxidizing agent may be supplied to the reaction chamber as plasma in which the oxidizing agent is used as a raw material.

The precursor including the second metal is gasified and supplied to the reaction chamber, which allows the second metal to be supplied on first dielectric layer 121 formed in porous body 112 of metal substrate 110 placed in the reaction chamber. The precursor is an organic metal compound including the second metal. This facilitates chemisorption of the second metal onto the object. Various kinds of organic metal compounds used in the conventional ALD method can be used as the precursor.

Examples of the precursor including Ti include bis(tert-butylcyclopentadienyl)titanium(IV) dichloride ($C_{18}H_{26}Cl_2Ti$), tetrakis(dimethylamino)titanium(IV) ($[(CH_3)_2N]_4Ti$, TDMAT), tetrakis(dimethylamino)titanium (IV) ($[(C_2H_5)_2N]_4Ti$), tetrakis(ethylmethylamino)titanium (IV) ($Ti[N(C_2H_5)(CH_3)]4$), titanium(IV) diisopropoxidebis (2,2,6,6-tetramethyl-3,5-heptanedionate) ($Ti[OCC(CH_3)_3 CHCOC(CH_3)_3]_2(OC_3H_7)_2$), titanium tetrachloride ($TiCl_4$), titanium(IV) isopropoxide ($Ti[OCH(CH_3)_2]_4$), and titanium (IV) ethoxide ($Ti[O(C_2H_5)]_4$).

Examples of the precursor including Zr include bis (methyl-$\eta^5$-cyclo-pentadienyl)methoxymethylzirconium ($Zr(CH_3C_5H_4)_2CH_3OCH_3$), tetrakis(dimethylamido)zirconium(IV) ($[(CH_3)_2N]_4Zr$), tetrakis(ethylmethylamido)zirconium(IV) ($Zr(NCH_3C_2H_5)_4$), and zirconium(IV) tert-butoxide ($Zr[OC(CH_3)_3]_4$).

Examples of the precursor including Nb include niobium (V) ethoxide ($Nb(OCH_2CH_3)_5$) and tris(diethylamido)(tert-butylimido)niobium(V) ($C_{16}H_{39}N_4Nb$).

Examples of the precursor including Si include N-sec-Butyl(trimethylsilyl)amine ($C_7H_{19}NSi$), 1,3-diethyl-1,1,3,3-tetramethyldisilazane ($C_8H_{23}NSi_2$), 2,4,6,8,10-pentamethyl-cyclopentasiloxane ($(CH_3SiHO)_5$), pentamethyldisilane ($(CH_3)_3SiSi(CH_3)_2H$), tris(isopropoxy)silanol ($[(H_3C)_2 CHO]_3SiOH$), chloropentamethyldisilane ($(CH_3)_3SiSi (CH_3)_2Cl$), dichlorosilane ($SiH_2Cl_2$), tris(dimethylamino) silane ($Si[N(CH_3)_2]_4$), tetraethylsilane ($Si(C_2H_5)_4$), tetramethylsilane ($Si(CH_3)_4$), tetraethoxysilane ($Si(OC_2H_5)_4$), dodecamethylcyclohexasilane ($(Si(CH_3)_2)_6$), silicon tetrachloride ($SiCl_4$), and silicon tetrabromide ($SiBr_4$).

Examples of the precursor including Ta include (t-butyl-imido)tris(ethylmethylamino)tantalum(V) ($Cl_3H_{33}N_4Ta$, TBTEMT), tantalum(V) ethoxide ($Ta(OC_2H_5)_5$), (t-butyl-imido)tris(diethylamino)tantalum(v) ($(CH_3)_3CNTa(N (C_2H_5)_2)_3$), and pentakis(dimethylamino)tantalum(V) ($Ta(N (CH_3)_2)_5$).

Examples of the precursor including Hf include hafnium tetrachloride ($HfCl_4$), tetrakis(dimethylamino)hafnium ($Hf[N(CH_3)_2]_4$), tetrakis(ethylmethylamino)hafnium ($Hf[N (C_2H_5)(CH_3)]_4$), tetrakis(dimethylamino)hafnium ($Hf[N (C_2H_5)_2]_4$), and hafnium-tert-butoxide ($Hf[OC(CH_3)_3]_4$).

A modification of the electrode manufacturing method including the steps (i) to (iii) will be described below.

In the manufacturing method of the modification, before first dielectric layer 121 is formed, the oxide of the second metal is provided so as to cover at least a part of the surface of the metal frame work of porous body 112. The oxide of the second metal constitutes the precursor of second dielectric layer 122. Subsequently, the anodization is performed on the metal frame work of porous body 112 of which at least a part is covered with the oxide of the second metal.

In the ALD method, the thin, uniform oxide of the second metal is formed, and a defect such as a pinhole can be made in the deep part of pit P. In the anodization, the ionized first metal is diffused in the oxide of the second metal, and second dielectric layer 122 is formed while the defect is repaired. A composite oxide of the first metal and the second metal is included in second dielectric layer 122 formed in this way. In other words, when second dielectric layer 122 includes composite oxide of the first metal and the second metal, the oxide of the second metal is formed first in the porous body, and then the anodization is performed. First dielectric layer 121 including the oxide of the first metal is formed between the metal frame work and second dielectric layer 122.

A thickness of first dielectric layer 121 in the above case become small as compared with a thickness of first dielectric layer 121 in the case that porous body 112 that does not include the oxide of the second metal is subjected to the anodization on the same condition. Further, the thickness of first dielectric layer 121 becomes smaller as the oxide of the second metal is formed to be thicker. This is because elution of the first metal during the anodization is suppressed while the number of defects of the oxide of the second metal that should be repaired by the first metal is increased. Consequently, second dielectric layer 122 is formed using the oxide of the second metal having a higher relative dielectric constant than that of the oxide of the first metal, and first dielectric layer 121 is formed by the anodization, which allows the electrostatic capacity of the resultant electrolytic capacitor to be further increased. This is because first dielectric layer 121 including the first metal that has lower relative dielectric constant becomes thin.

(iv) Step of Letting Porous Portion of Electrode Include at Least One of Electrolytic Solution and Solid Electrolyte Subsequently, the electrolytic capacitor is formed by letting the porous portion of the obtained electrode include at least one of electrolytic solution and solid electrolyte. The impregnation of the electrolytic solution may be performed after the solid electrolyte layer is formed by letting the porous portion include the solid electrolyte.

The electrolytic solution may be a nonaqueous solvent or a mixture of a nonaqueous solvent and an ionic material (a solute, for example, an organic salt) dissolved in the nonaqueous solvent. The organic salt is a salt in which at least one of an anion or a cation includes organic component. The nonaqueous solvent may be an organic solvent or an ionic liquid. The nonaqueous solvent is preferably a solvent having a high boiling point. Since the electrolytic solution has high polarity, impregnating ability of the electrolytic solution into the porous portion is enhanced to increase the electrostatic capacity with increasing wettability of the porous portion to water due to small dynamic contact angle of water in the porous portion.

Examples of the nonaqueous solvent include polyols such as ethylene glycol and propylene glycol, cyclic sulfones such as sulfolane, lactones such as γ-butyrolactone, amides such as N-methylacetamide, N,N-dimethylformamide, and N-methyl-2-pyrrolidone, esters such as methyl acetate, carbonate compounds such as propylene carbonate, ethers such as 1,4-dioxane, ketones such as methyl ethyl ketone, and formaldehyde.

Examples of the organic salt include trimethylamine maleate, triethylamine borodisalicylate, ethyldimethylamine phthalate, mono 1,2,3,4-tetramethylimidazolinium phthalate, and mono 1,3-dimethyl-2-ethylimidazolinium phthalate.

For example, the solid electrolytes include a manganese compound and a conductive polymer. Examples of the conductive polymer include polypyrrole, polythiophene, polyaniline, and derivatives of polypyrrole, polythiophene, and polyaniline.

The solid electrolyte layer including a conductive polymer can be formed through, for example, chemical polymerization and/or electrolytic polymerization of a raw material monomer on second dielectric layer 122. Since a polymerization reaction is performed in a liquid phase containing water, the impregnating ability of the raw material monomer into the deep part of the porous portion is enhanced to form the conductive polymer even in the deep part with increasing wettability of the porous portion to water due to small dynamic contact angle of water in the porous portion. Thus, the electrostatic capacity increases.

Alternatively, the solid electrolyte layer including the conductive polymer may be formed by impregnating second dielectric layer 122 with or by applying a solution in which the conductive polymer is dissolved or a dispersion liquid in which the conductive polymer is dispersed. Since the solution or the dispersion liquid contains water, the impregnating ability of the conductive polymer into the deep part of the porous portion is enhanced to increase the electrostatic capacity with increasing wettability of the porous portion to water due to small dynamic contact angle of water in the porous portion.

Figure 5:
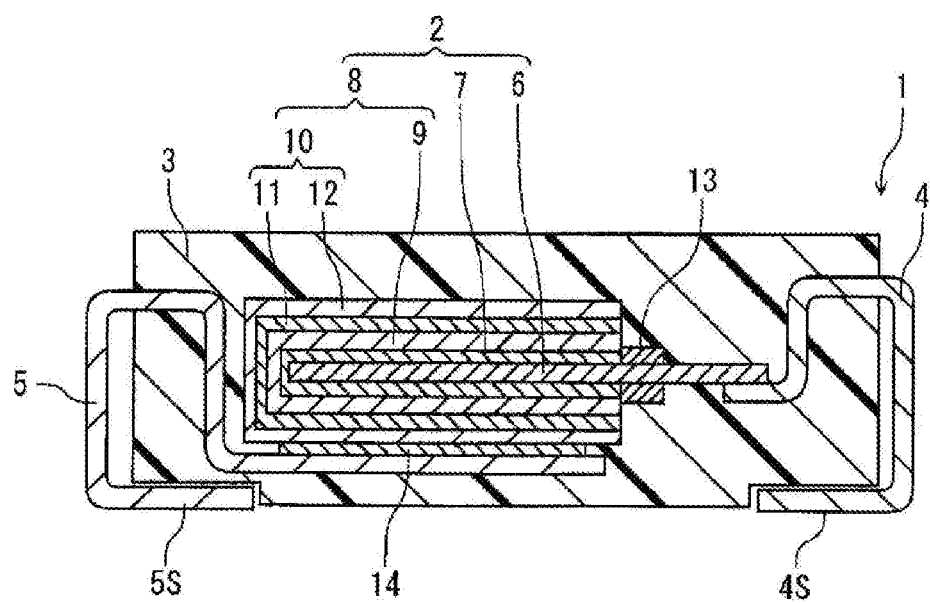
FIG. 5 is a sectional view schematically illustrating an example of an electrolytic capacitor according to the exemplary embodiment of the present disclosure.

FIG. 5 is a sectional view schematically illustrating a configuration of an electrolytic capacitor according to the exemplary embodiment of the present disclosure. Electrolytic capacitor 1 includes capacitor element 2, outer packaging resin layer 3 sealing capacitor element 2, anode terminal 4 (anode lead frame) in which at least a part is exposed to the outside of outer packaging resin layer 3, and cathode terminal 5 (cathode lead frame) in which at least a part is exposed to the outside of outer packaging resin layer 3. Outer packaging resin layer 3 has a substantially hexahedron outer shape, and electrolytic capacitor 1 also has a substantially hexahedron outer shape. After capacitor element 2, anode lead frame 4, and cathode lead frame 5 are electrically connected to one another, and capacitor element 2 and a part of each lead frame are covered with outer packaging resin layer 3, thereby obtaining electrolytic capacitor 1. Main surface 4S of anode terminal 4 and main surface 5S of cathode terminal 5 are disposed in the same surface of outer packaging resin layer 3. Main surface 4S and main surface 5S are used for soldering connection with a substrate (not illustrated) on which electrolytic capacitor 1 should be mounted.

Capacitor element 2 includes anode body 6, dielectric layer 7 covering anode body 6, and cathode part 8 covering dielectric layer 7. Electrode 100 including core portion 111 and porous portion 120 constitutes anode body 6 and dielectric layer 7. Metal substrate 110 constituting electrode 100 corresponds to anode body 6. First dielectric layer 121 and second dielectric layer 122 constitute dielectric layer 7.

Cathode part 8 includes solid electrolyte layer 9 covering dielectric layer 7 and cathode lead-out layer 10 covering solid electrolyte layer 9. Cathode lead-out layer 10 includes carbon layer 11 and silver paste layer 12. Cathode lead-out layer 10 is formed by sequentially laminating carbon layer 11 and silver paste layer 12 on solid electrolyte layer 9.

Anode body 6 includes a region opposed to cathode part 8 and a region that is not opposed to cathode part 8. In the region of anode body 6 that is not opposed to cathode part 8, insulating separation layer 13 is formed in a portion adjacent to cathode part 8 so as to zonally cover the surface of anode body 6, thereby regulating contact between cathode part 8 and anode body 6. In the region of anode body 6 that is not opposed to cathode part 8, another part is electrically connected to anode terminal 4 by welding. Cathode terminal 5 is electrically connected to cathode part 8 through adhesive layer 14 made of a conductive adhesive.

Outer packaging resin layer 3 can be formed by a molding technique such as injection molding, insert molding, or compression molding. For example, capacitor element 2 is disposed in a predetermined metal mold, and the metal mold is filled with a curing resin composition such that an outer surface of capacitor element 2 and a part of the lead frame are covered, which allows the formation of outer packaging resin layer 3.

In the exemplary embodiment, the chip type electrolytic capacitor is described. However, the present disclosure is not limited to the chip type electrolytic capacitor, but can also be applied to other electrolytic capacitors such as wound type electrolytic capacitor.

Hereinafter, the present disclosure is described in more detail with reference to examples. However, the present disclosure is not limited to the examples.

Example 1

(Preparation of Metal Substrate)

An aluminum foil having a thickness of 120 μm was prepared. The aluminum foil was subjected to the AC etching to make the surface porous. And the metal substrate including the core portion and the porous body was obtained. The porous body having the thickness of 40 μm was formed on both sides of the aluminum foil as the etched region. The modal pore diameter of the pore distribution measured with the mercury porosimeter ranged from 100 nm to 200 nm, inclusive.

(Formation of First Dielectric Layer)

The metal substrate was subjected to the anodization to form the first dielectric layer. The anodization was performed by immersing the metal substrate in the adipic acid ammonium solution and applying voltage (Vf) of 4 V to the metal substrate.

(Formation of Second Dielectric Layer)

A titanium oxide film (3.5 nm) as the second dielectric layer was formed on the surface of the first dielectric layer by the ALD method (temperature: 200° C., precursor: TDMAT, oxidizing agent: $H_2O$, pressure: 10 Pa, 90 cycles). And the porous portion including the porous body, the first dielectric layer, and the second dielectric layer was formed. Subsequently, the electrode including the core portion and the porous portion was cut to prepare electrode A1 including the dielectric layer. Thickness T of the porous portion was 40 μm as same as the thickness of the porous body.

Example 2

Similarly to Example 1, electrode A2 including the dielectric layer was prepared except that the number of cycles of the ALD method was changed to 180 cycles, and that the thickness of the second dielectric layer was changed to 7 nm.

Comparative Example 1

Similarly to Example 1, electrode B1 including the dielectric layer (only the first dielectric layer) was prepared except that the second dielectric layer was not formed.

Example 3

Similarly to Example 1, electrode A3 including the dielectric layer (second dielectric layer having the thickness of 3.5 nm) was prepared except that the voltage (Vf) of 16.5 V was applied to the metal substrate when the metal substrate was subjected to the anodization.

Example 4

Similarly to Example 3, electrode A4 including the dielectric layer (second dielectric layer having the thickness of 7 nm) was prepared except that the voltage (Vf) of 16.5 V was applied to the metal substrate when the metal substrate was subjected to the anodization.

Comparative Example 2

Similarly to Comparative example 1, electrode B2 including the dielectric layer (only the first dielectric layer) was prepared except that the voltage (Vf) of 16.5 V was applied to the metal substrate when the metal substrate was subjected to the anodization.

Example 5

Similarly to Example 1, electrode A5 including the dielectric layer was prepared except that order of forming the first dielectric layer and the second dielectric layer was exchanged. That is, the titanium oxide film (3.5 nm) was formed first on the metal substrate by the ALD method (temperature: 200° C., precursor: TDMAT, oxidizing agent: $H_2O$, pressure: 10 Pa, 90 cycles), and then the anodization was performed in the adipic acid ammonium solution by applying the voltage (Vf) of 4 V to the metal substrate including the titanium oxide film. As a result of elemental analysis of the porous portion by the EDX, the second dielectric layer included $TiO_2$ and the composite oxide of Ti and Al.

Example 6

Similarly to Example 5, electrode A6 including the dielectric layer was prepared except that the number of cycles of the ALD method was changed to 180 cycles, and that the thickness of the second dielectric layer (including the composite oxide) was changed to 7 nm.

Example 7

Similarly to Example 1, electrode A7 including the dielectric layer was prepared except that the precursor was changed to TBTEMT, that the oxidizing agent was changed to ozone, and that the film (thickness of 50 nm) made of the tantalum oxide was formed by the ALD method.

[Evaluation 1]

When the sectional quantitative X-ray mapping of the porous portion was performed by the EDX, existence of the second metal was confirmed even to the deepest part (the position where a distance from the core portion is zero) of the porous portion. A value of a ratio of the atom ratio: $R_{0.75}/R_{0.5}$ and $R_{0.5}/R_{0.25}$ was obtained. Table 1 shows the results.

[Evaluation 2]

The contact angle of water in the porous portion was measured by the drop method. Table 1 shows the contact angles after 100 seconds since the drop of the water droplet.

TABLE 1

| Anode body | First dielectric layer Composition | First dielectric layer Vf | Second dielectric layer Composition | Second dielectric layer Thickness | $R_{0.75}/R_{0.5}$ | $R_{0.5}/R_{0.25}$ | Contact angle (°) |
|---|---|---|---|---|---|---|---|
| A1 | $Al_2O_3$ | 4 V | $TiO_2$ | 3.5 | 1.09 | 1.24 | 15.2 |
| A2 | $Al_2O_3$ | 4 V | $TiO_2$ | 7 | 1.09 | 1.24 | 11.7 |
| B1 | $Al_2O_3$ | 4 V | — | — | — | — | 65.0 |
| A3 | $Al_2O_3$ | 16.5 V | $TiO_2$ | 3.5 | 1.10 | 1.26 | 9.6 |
| A4 | $Al_2O_3$ | 16.5 V | $TiO_2$ | 7 | 1.10 | 1.26 | 5.8 |
| B2 | $Al_2O_3$ | 16.5 V | — | — | — | — | 40.0 |
| A5 | $Al_2O_3$ | 4 V | $TiAlO_x$ | 3.5 | 1.08 | 1.22 | 23.5 |
| A6 | $Al_2O_3$ | 4 V | $TiAlO_x$ | 7 | 1.08 | 1.22 | 19.7 |
| A7 | $Al_2O_3$ | 4 V | $Ta_2O_5$ | 50 | 1.08 | 1.30 | 35.0 |

As can be seen from the result of Table 1, the oxide including the second metal is formed to the deep part of the porous portion in Examples 1 to 7. In the electrodes of Examples 1 to 7, the wettability to water is significantly improved as compared with the electrodes of Comparative examples 1, 2.

[Evaluation 3]

The solid electrolyte layer was formed in each of the electrodes of Comparative examples 1, 2 and Examples 3, 6 to form the capacitor element. Specifically, each electrode was immersed in an aqueous dispersion (concentration of 2 mass %) of poly(3,4-ethylenedioxythiophene) (PEDOT) doped with polystyrene sulfonic acid (PSS), and dried to form the solid electrolyte layer. Subsequently, a dispersion liquid obtained by dispersing graphite particles in water was applied to the solid electrolyte layer, and dried to form the carbon layer on the surface of the solid electrolyte layer. Subsequently, sliver paste containing silver particles and an epoxy resin was applied onto the surface of the carbon layer, and the epoxy resin was cured by heating to form a silver paste layer. The anode terminal and the cathode terminal were connected to the obtained capacitor element, and sealing was performed using the outer packaging resin layer to prepare the electrolytic capacitor.

<Evaluation 3-1>

The electrostatic capacity of the electrolytic capacitor was measured at 120 Hz with an LCR meter. A ratio of each of the electrostatic capacities that electrodes A6, A3 of Examples 6, 3 were used with respect to the electrostatic capacities of Comparative examples 1, 2 were obtained when the electrostatic capacities of Comparative examples 1, 2 were set to 100%.

<Evaluation 3-2>

A capacitance achievement ratio was obtained when the solid electrolyte layer was formed in each of the electrodes. That is, electrostatic capacity $C_0$ of the electrode in which the solid electrolyte layer was not formed in the adipic acid ammonium aqueous solution (15 wt %) and electrostatic capacity $C_X$ of the electrode in which the solid electrolyte layer was formed were measured at 120 Hz using the LCR meter. And a ratio of $C_X$ to $C_0$ was obtained as the capacitance achievement ratio.

The capacitance achievement ratio becomes 100% when the porous portion is completely covered with the solid electrolyte layer. However, in general, the porous portion is not completely covered with the solid electrolyte layer, the capacitance achievement ratio becomes lower than 100%. Subsequently, a ratio of the capacitance achievement ratio of each of Examples 6, 3 with respect to the capacitance achievement ratios of Comparative examples 1, 2 was obtained when the capacitance achievement ratios of Comparative examples 1, 2 were set to 100%. Table 2 shows the results.

<Evaluation 3-3>

A withstand voltage of each of the electrolytic capacitors was measured by an evaluation method of an EIAJ standard. Specifically, the electrode in which the solid electrolyte layer was not formed was immersed in the adipic acid ammonium aqueous solution (15 wt %). Subsequently, a regular measurement current was followed, and the voltage after 3 minutes±10 seconds since reaching the voltage (Vr) of 90% of a rated withstand voltage (Vf) was measured as the withstand voltage (Vt). A ratio of each of the withstand voltages of Examples 6, 3 with respect to the withstand voltages of Comparative examples 1, 2 was obtained when the withstand voltages of Comparative examples 1, 2 were set to 100%.

TABLE 2

| Anode body | Electrostatic capacity (%) | Capacitance achievement ratio (%) | Withstand voltage Vt (%) |
|---|---|---|---|
| B1 | 100 | 100 | 100 |
| A6 | 115 | 108 | 120 |
| B2 | 100 | 100 | 100 |
| A3 | 95 | 117 | 100 |

As can be seen from the results of Table 2, in Examples 6, 3, the capacitance achievement ratios exceed 100%, and a coverage of the porous portion with the solid electrolyte layer increases. This is attributed to the fact that the wettability of electrodes A6, A3 to water is significantly improved as compared with electrodes B1, B2, and an aqueous dispersion of PEDOT doped with PSS sufficiently infiltrates into the porous portions of electrodes A6, A3 during the formation of the solid electrolyte layer.

The electrolytic capacitor of the present disclosure has excellent electrostatic capacity and thus is applicable to various applications.

What is claimed is:

1. An electrode comprising:
a core portion including a first metal; and
a porous portion disposed in contact with the core portion,
wherein:
the porous portion includes:
  a porous body integrated with the core portion, the porous body including the first metal;
  a first dielectric layer covering at least a part of a surface of the porous body; and
  a second dielectric layer covering at least a part of the first dielectric layer,
the first dielectric layer includes oxide of the first metal,
the second dielectric layer includes oxide of a second metal, the second metal being different from the first metal,
when T is a thickness of the porous portion, the second metal is distributed to a region closer to the core portion than a position of 0.5T from a boundary between the core portion and the porous portion, and
$1.08 \leq R_{0.75}/R_{0.5} \leq 1.2$ is satisfied,
where $R_{0.5}$ is an atom ratio of the second metal to the first metal at a position of 0.5T from the boundary between the core portion and the porous portion, and $R_{0.75}$ is an atom ratio of the second metal to the first metal at a position of 0.75T from the boundary between the core portion and the porous portion.

2. The electrode according to claim 1, wherein $1.22 \leq R_{0.5}/R_{0.25} \leq 1.4$ is satisfied, where $R_{0.25}$ is an atom ratio of the second metal to the first metal at a position of 0.25T from the boundary between the core portion and the porous portion, and $R_{0.5}$ is an atom ratio of the second metal to the first metal at a position of 0.5T from the boundary between the core portion and the porous portion.

3. The electrode according to claim 1, wherein a dynamic contact angle of water in the porous portion is less than or equal to 60°.

4. The electrode according to claim 1, wherein wettability of the oxide of the first metal to water is higher than wettability of the oxide of the second metal to water.

5. The electrode according to claim 1, wherein the second dielectric layer contains a composite oxide containing the first metal and the second metal.

6. The electrode according to claim 1, wherein
the first metal is aluminum, and
the second metal is one selected from a group consisting of titanium, tantalum, niobium, zirconium, hafnium, and silicon.

7. An electrolytic capacitor comprising:
the electrode according to claim 1; and
at least one of an electrolytic solution or a solid electrolyte that is included in the porous portion of the electrode.

8. An electrode comprising:
a core portion including a first metal; and
a porous portion disposed in contact with the core portion,
wherein:
the porous portion includes:
a porous body integrated with the core portion, the porous body including the first metal;
a first dielectric layer covering at least a part of a surface of the porous body; and
a second dielectric layer covering at least a part of the first dielectric layer,
the first dielectric layer includes oxide of the first metal,
the second dielectric layer includes oxide of a second metal, the second metal being different from the first metal,
when T is a thickness of the porous portion, the second metal is distributed to a region closer to the core portion than a position of 0.5T from a boundary between the core portion and the porous portion, and
the second dielectric layer contains a composite oxide containing the first metal and the second metal.

9. The electrode according to claim 8, wherein a dynamic contact angle of water in the porous portion is less than or equal to 60°.

10. The electrode according to claim 8, wherein wettability of the oxide of the first metal to water is higher than wettability of the oxide of the second metal to water.

11. The electrode according to claim 8, wherein
the first metal is aluminum, and
the second metal is one selected from a group consisting of titanium, tantalum, niobium, zirconium, hafnium, and silicon.

12. An electrolytic capacitor comprising:
the electrode according to claim 8; and
at least one of an electrolytic solution or a solid electrolyte that is included in the porous portion of the electrode.

13. An electrolytic capacitor comprising:
an electrode including a core portion including a first metal and a porous portion disposed in contact with the core portion; and
at least one of an electrolytic solution or a solid electrolyte that is included in the porous portion of the electrode,
wherein:
the porous portion includes:
a porous body integrated with the core portion, the porous body including the first metal;
a first dielectric layer covering at least a part of a surface of the porous body; and
a second dielectric layer covering at least a part of the first dielectric layer,
the first dielectric layer includes oxide of the first metal,
the second dielectric layer includes oxide of a second metal, the second metal being different from the first metal,
when T is a thickness of the porous portion, the second metal is distributed to a region closer to the core portion than a position of 0.5T from a boundary between the core portion and the porous portion, and
at least a part of the second dielectric layer is in direct contact with the at least one of an electrolytic solution or a solid electrolyte.

14. The electrolytic capacitor according to claim 13, wherein a dynamic contact angle of water in the porous portion is less than or equal to 60°.

15. The electrolytic capacitor according to claim 13, wherein wettability of the oxide of the first metal to water is higher than wettability of the oxide of the second metal to water.

16. The electrolytic capacitor according to claim 13, wherein the second dielectric layer contains a composite oxide containing the first metal and the second metal.

17. The electrolytic capacitor according to claim 13, wherein:
the first metal is aluminum, and
the second metal is one selected from a group consisting of titanium, tantalum, niobium, zirconium, hafnium, and silicon.

* * * * *